UNITED STATES PATENT OFFICE.

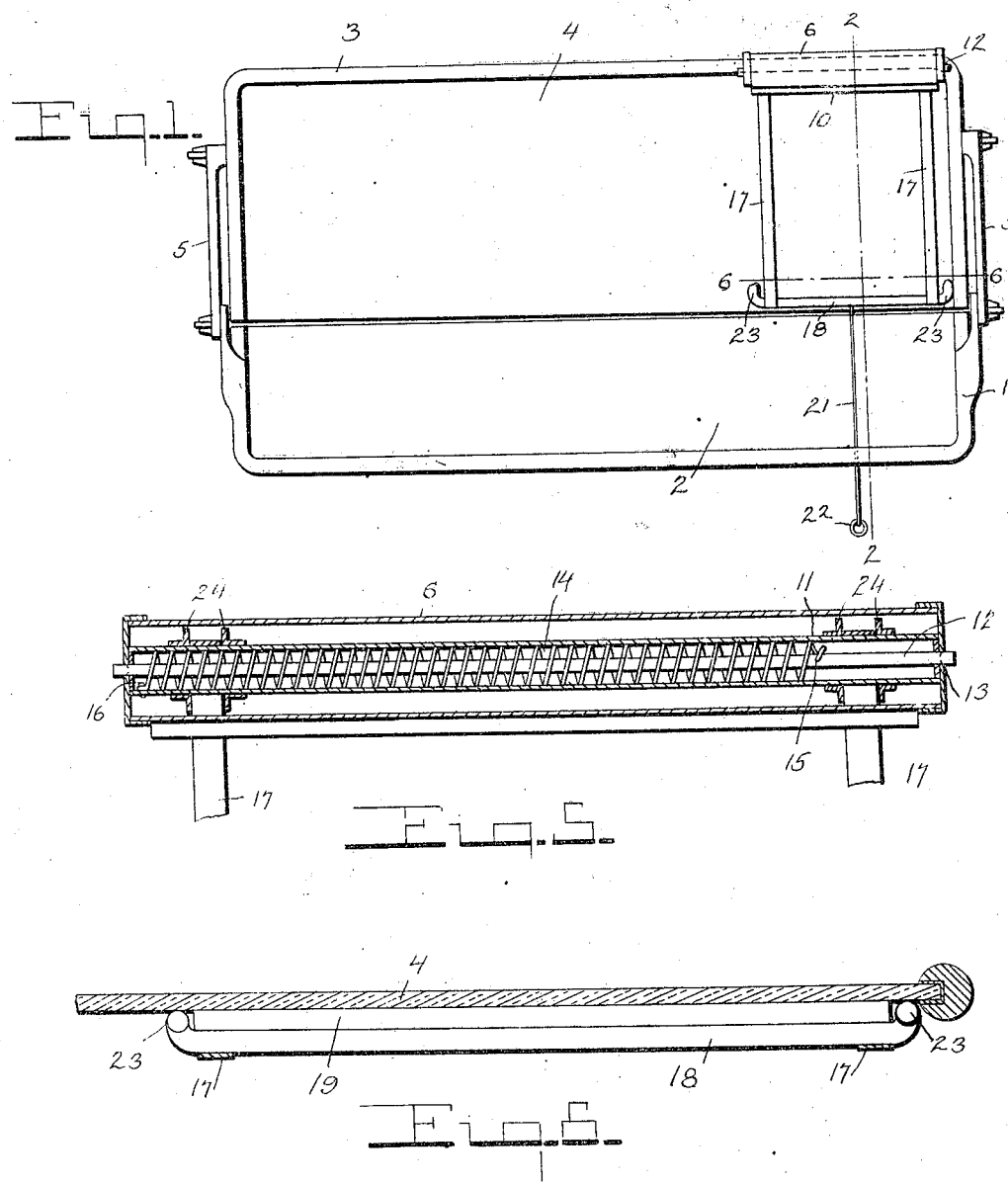

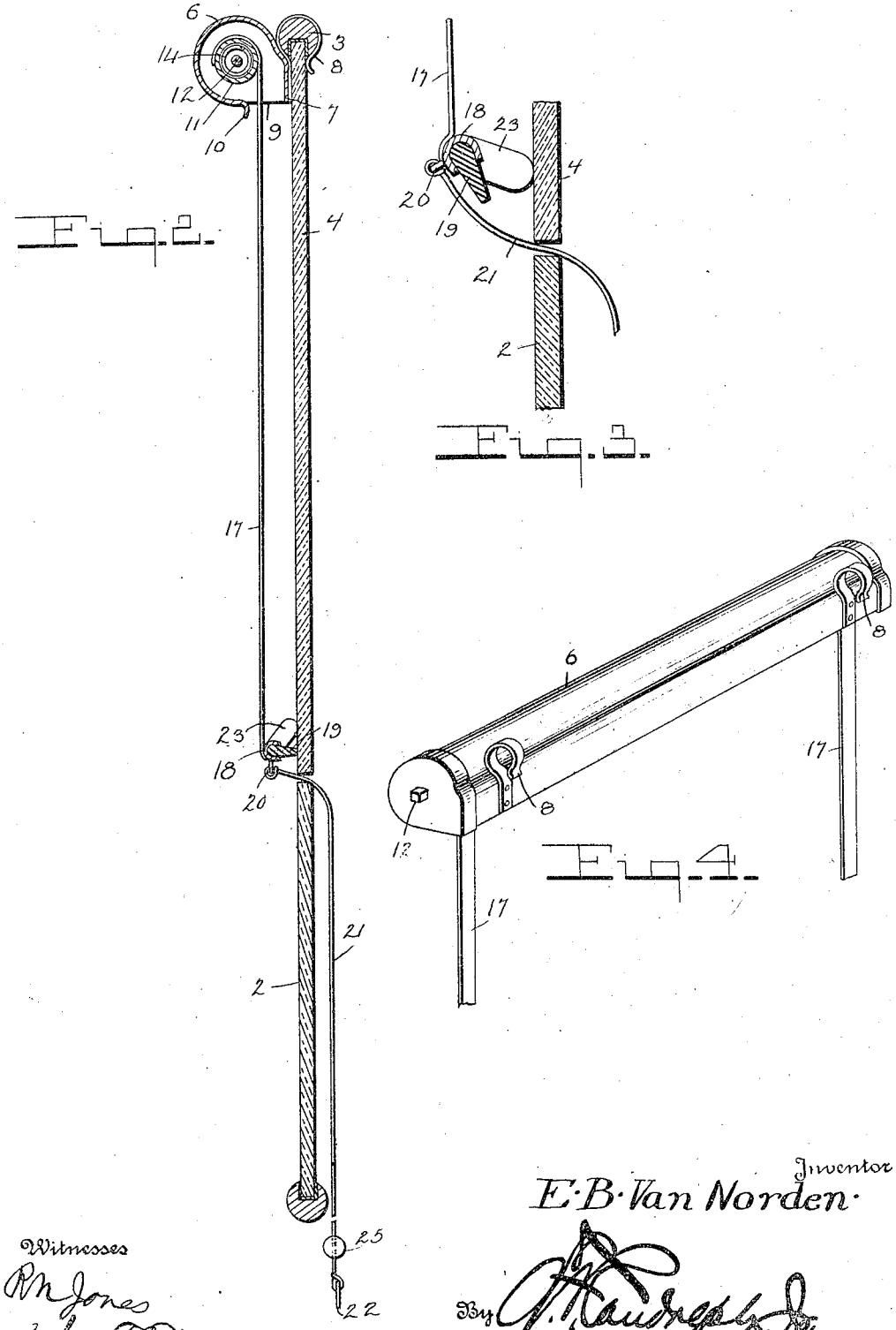

ERICSON B. VAN NORDEN, OF SPRINGFIELD, MASSACHUSETTS, ASSIGNOR OF ONE-FOURTH TO WILLIAM F. DANIELS AND ONE-FOURTH TO WAVERLY D. PACKARD, BOTH OF SPRINGFIELD, MASSACHUSETTS.

WIND-SHIELD CLEANER.

1,199,636. Specification of Letters Patent. Patented Sept. 26, 1916.

Application filed December 15, 1915. Serial No. 67,006.

*To all whom it may concern:*

Be it known that I, ERICSON B. VAN NORDEN, a citizen of the United States, residing at Springfield, in the county of Hampden and State of Massachusetts, have invented certain new and useful Improvements in Wind-Shield Cleaners; and I do hereby declare the following to be a full, clear, and exact description of the invention, such as will enable others skilled in the art to which it appertains to make and use the same.

This invention relates to new and useful improvements in a wind shield cleaner, to remove rain and snow or moisture from a wind shield of an automobile or any other motor propelled vehicle, while being driven through a storm, to provide a clean glass for the operator to look through, and avoid collisions with other vehicles or other accidents that may occur when operating an automobile during stormy weather.

A further object of this invention is the provision of means for normally holding the wiper in an operative position and having the operating mechanism for drawing the wiper downwardly over the glass of the wind shield in a handy position to the operator.

A further object of this invention is the provision of a casing to support a wiper, which is capable of being easily and quickly applied to the upper and outer edge of a wind shield, and which may be readily removed and stored in a convenient place within an automobile when not desiring to employ it in clear weather.

A still further and more specific object of this invention is the provision of a wiper, having a rubber wiping surface and provided with its ends bent at right angles to engage the glass of a wind shield, when the wiper is being automatically returned to the casing to prevent the wiper from engaging the glass and streaking it with the moisture collected thereon during the downward movement of the wiper.

With these and other objects in view as will become apparent as the description proceeds, the invention consists in certain novel features of construction, combination and arrangement of parts as will be hereinafter more fully described and claimed.

For a complete understanding of my invention, reference is to be had to the following description and accompanying drawings, in which:—

Figure 1 is a front elevation, illustrating my invention applied to a wind shield of an automobile, Fig. 2 is a sectional elevation taken on the line 2—2 of Fig. 1, Fig. 3 is a detail sectional view through the wiper, Fig. 4 is a perspective view of the casing, Fig. 5 is a longitudinal sectional view through the casing, and Fig. 6 is a horizontal sectional view of the wiper taken on the line 6—6 of Fig. 1.

Referring in detail to the drawings, 1 designates the lower frame of a wind shield, having a glass 2 secured therein and pivotally secured to the frame 1 is an upper frame 3 by means of arms 5, having a glass 4 secured therein constituting a wind shield of a well known type, to which my invention is applied.

Referring to my invention it consists of a circular casing 6, having a straight wall 7, to which is secured a plurality of spring hooks or clamps 8, which clamp over the frame 3 and support the casing on the frame 3 at any desired point to bring it in front of the operator. The casing 6 is provided with an opening 9 extending its entire length and having the edge of the casing 6 bent at right angles thereto as illustrated at 10 of Fig. 2.

Mounted within the casing 6 is a spring tension roller consisting of a cylindrical roller 11 having a transverse shaft 12 extending therethrough and into the openings 13 provided within the ends of the casing 6, to support the roller 11 therein. A spring 14 is wound around the shaft 12 and has one of its ends secured to the shaft 12 as indicated at 15 and its other end secured to the interior of the roller 11 as indicated at 16. The roller 11 is rotated against the tension of the spring 14 in a desired direction and has secured to the face thereof a pair flexible metallic supporting strips 17, which will be caused to wind around the roller 11 after the roller 11 has been released against the tension of the spring 14. A pair of relatively spaced collars 24 are secured to each end of the roller 11 to receive the strip 17 when being wound upon the roller 11.

Secured to the free end of the strip 17 is a wiper consisting of a substantially U-shaped body portion 18, having a rubber 19 secured therein for engagement with the glass 4 of a wind shield to remove moisture or other accumulations therefrom. A screw eye 20 is secured to the body portion 18 on the outside thereof and has attached thereto a cord 21, which extends between the upper glass 4 and the lower glass 2, and extends to the interior of an automobile and has secured to the free end a handle 22, which may be easily grasped by the operator when desired. Adjustably secured to the cord 21 is a rubber stop 25 to engage the glasses 2 and 4 when the wiper has been drawn into close relations with the casing 6 to provide a tension upon the cord 21 to prevent the wiper from swinging against the glass 4. The ends of the body portion 18 are bent at right angles as indicated at 23 and extended in the direction of the wind shield to engage the glass and raise the rubber 19 from engagement therewith when the wiper is being automatically returned to the casing 6, to prevent the rubber 19 from streaking the glass on its upward movement.

From the foregoing description taken in connection with the accompanying drawings, it will be seen that when the operator pulls on the handle 22 the wiper or U-shaped body portion 18 will move downwardly from the casing 6 against the tension of the spring 14 and will cause the rubber 19 to engage the glass of a wind shield and move the ends 23 away from an engagement with the glass and remove the moisture or other accumulations therefrom. When the operator releases the pull on the handle 22 the wiper will return to the casing 6 by the spring 14 and the arms 23 will move into an engagement with the glass and hold the rubber 19 from an engagement therewith and prevent the rubber from streaking the glass owing to the accumulations of moisture thereon received from the glass on its downward movement when it returns to the casing 6.

While I have shown and described the preferred embodiment of my invention, it will be understood that minor changes in construction, combination and arrangement of parts may be made without departing from the spirit and scope of the invention as claimed.

What I claim is:—

1. A wind shield cleaner comprising a substantially circular casing have a flat wall, a plurality of clamps secured to the flat wall and adapted to engage the frame of a wind shield to support said casing, said casing provided with an opening extending its entire length, a spring tension roller rotatably mounted in said casing, means carried by said roller for cleaning moisture from the glass of a wind shield, and means for operating said cleaning means.

2. A wind shield cleaner comprising a substantially circular casing having a flat rear wall, a plurality of clamps secured to said flat wall and adapted to engage the frame of a wind shield to support said casing, said casing provided with an opening extending its entire length, a spring tension roller rotatably mounted in said casing, flexible metallic strips secured to said roller and extending through the opening of said casing, a wiper carried by the lower end of said strips, and means for pulling said wiper downwardly over the glass of a wind shield.

3. A wind shield cleaner comprising a substantially circular casing having a flat rear wall, clamps secured to said flat wall and adapted to engage the frame of a wind shield to support said casing, a spring tension roller journaled in said casing, flexible metallic strips secured to said roller and extending through the casing, a substantially U-shaped body portion secured to the end of said strips, a rubber wiper secured within said U-shaped body portion for an engagement with the glass of a wind shield when the wiper is pulled downwardly from the casing, and means for holding said rubber away from an engagement with the glass of a wind shield when the U-shaped body is automatically returned to the casing.

4. A wind shield cleaner comprising a substantially circular casing having a flat rear wall, means secured to said flat wall for supporting the casing to the frame of a wind shield, a spring tension roller journaled within said casing, flexible metallic strips secured to said roller and extending through said casing, a substantially U-shaped body portion secured to the free end of said strips, a rubber secured within said U-shaped body portion and adapted to engage the glass of a wind shield when pulled down from the casing, said U-shaped body portion provided with its ends bent at right angles and extending in the direction of a wind shield to engage said wind shield when the U-shaped body portion is returning to the casing to hold said rubber from an engagement with the glass of a wind shield, and means attached to the U-shaped body and extending between the glasses of a wind shield to pull the U-shaped body downwardly from the casing.

In testimony whereof, I affix my signature in presence of two witnesses.

ERICSON B. VAN NORDEN.

Witnesses:
WAVERLY D. PACKARD,
JOHN M. REYNOLDS.